Aug. 13, 1935.                L. C. SMITH                2,011,379
REFRIGERANT CONTROL DEVICE
Filed Oct. 13, 1933
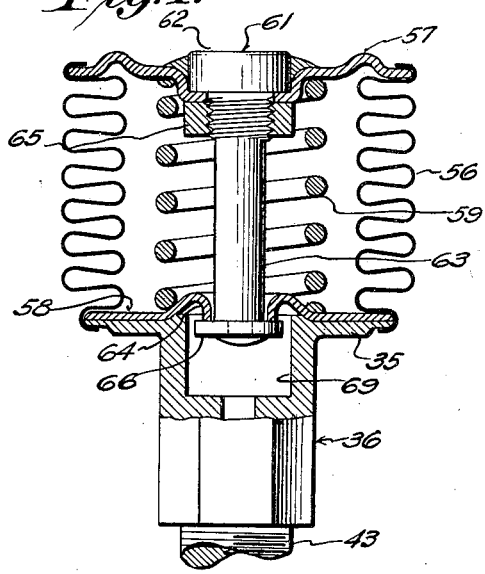
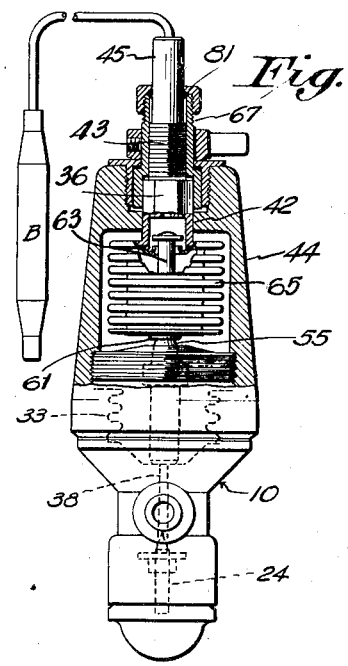
Inventor
Lawrence C. Smith
Albert R Henry
Attorney Patented Aug. 13, 1935

2,011,379

UNITED STATES PATENT OFFICE 2,011,379

REFRIGERANT CONTROL DEVICE

Lawrence C. Smith, Kenmore, N. Y., assignor to Fedders Manufacturing Company, Inc., Buffalo, N. Y.

Application October 13, 1933, Serial No. 693,474

2 Claims. (Cl. 297—8)

This invention relates to control devices for use in refrigeration systems of the direct expansion type.

The invention will be found to reside particularly in improvements in the thermostatic or power units of valves of the thermostatic expansion type. These units usually consist of an expansible bellows and a communicating bulb containing a readily expansible fluid for causing the expansion or contraction of the bellows in accordance with temperature conditions. When these units are properly installed in a valve it may not expand to the rupturing point of the bellows, since means are provided to limit its movement. However, when shipping the units separately, it has heretofore been found necessary to provide a cage for the bellows to prevent destructive expansion. Similarly, when repairing a valve by replacing a power unit, proper temperature conditions had to be maintained therein to prevent expansion damage during assembly.

In the present invention it is sought to overcome these difficulties by devising the power unit with self-contained expansion and contraction stops which are suitably devised to protect the bellows during any shipping or servicing condition. This has been accomplished in several structures, herein described, without sacrificing efficiency or space, or affecting the unit in any manner in its normal assembled relation with the valve.

The invention is described more specifically in the accompanying specification and drawing, wherein:

Fig. 1 is a sectional view of a stop member embodying the principles of the present invention;

Fig. 2 is a side elevation of a thermostatic expansion valve assembly on a reduced scale, portions of which are shown in section to disclose the disposal of the invention therein.

The present power unit is particularly devised for use in the thermostatic expansion valve disclosed in my co-pending application, Serial No. 683,146, filed August 1, 1933. For convenience of reference, the important portions of this valve are hereinafter described by reference numerals identical to those by which they are designated in said co-pending application. The valve is formed with a body 10 containing a needle valve 24, which is actuated by a power unit, hereinafter described, through rods 38 and a connecting rod 55. A sealing bellows 33 separates the rods 38 from the connecting rod 55, and it acts to seal the body 10 and the included valve 24 from the overlying power unit and its housing structure. The power unit housing 44 is removably secured to the body 10 and the rod 55, which it contains, is also removable so that the housing 44 is accessible for insertion or removal of the power unit.

The upper end of the housing 44 is provided with means for mounting an adjusting nut 67 which is internally threaded and rotatable from the exterior of the housing. The diameter of this threaded portion is such as to permit the insertion or removal of the bulb B of a power unit therethrough. This structure cooperates with the hereinafter described structure in permitting the changing of bellows for substitution or repair, and it is rendered more efficient by the provision of safety stops herein incorporated in the bellows to prevent rupture during such changing.

As shown in Fig. 1, the power unit comprises a flexible and expansible metal bellows 65, the inner end of which is turned over and secured to the edge of an end plate 57 formed with a central aperture adapted to receive a post 63. The outer end of the post 63 is formed with a head 62 having an end face 61 which is adapted to contact the member 55 (Fig. 2), thereby effecting the actuation of the valve mechanism. That part of the post 63 adjacent the end plate 57 and head 62 is formed with a screw thread receiving a nut 65, so that the post may be securely clamped to the end plate 57, and the joint is protected against leakage by filling with solder, as shown in the drawing.

The opposite end of the bellows 65 is turned over and secured to an end plate 58, which is also formed with a centrally disposed aperture defined by an axial flange 64, and the post 63 protrudes through this aperture, being held at its outer end by means of a cap washer 66 secured thereto. Surrounding the post 63, and between the plates 57 and 58, is a coiled spring 59, which urges the bellows into an extended position, the extent of which is of course limited by the length of the post 63. It will thus be seen that a limit stop is provided, preventing undue expansion of the bellows at any time.

As best shown in Fig. 2, the bellows B is connected by a suitable length of flexible tubing to a cylindrical ferrule 45 which is adapted to pass through the packing gland 81 of the control valve, being associated therewith to provide a fluid tight joint. The ferrule 45 merges into a threaded portion 43, adapted to be received in a complementary portion 67 of the valve, which portion 67 is formed with an enlarged cavity receiving a polygonal portion 36 contiguous with the threaded portion 43. This polygonal portion, in turn, is fitted into a complementary recess 42, formed in the body 44 of the valve. It will thus be seen that the power element can be inserted into or withdrawn from the inner side of the body 44.

The polygonal head 36 is provided with a circular flange portion 35 which abuts the end plate 58, and is overlapped on its rim by the end of the bellows 65, so that the bellows, plate 58, and flange 35 may be simultaneously assembled in fixed relation. A cavity 69 is formed in the head 36, adjacent the flange 35, to receive freely the protruding end of the bellows post 63, and to allow for limited endwise movement. It will thus be seen that, when the bellows 65 is compressed, the post 63 may move with it into the cavity 69, but such movement is limited to such extent that while all normal motion of the bellows is provided for, undue and destructive compression cannot take place.

I claim:

1. A power unit for a thermostatic expansion valve, comprising an open bellows, inner and outer head plates closing opposite ends of the bellows to form a chamber therein, a drilled stem secured to the inner plate and adjoining end of the bellows, said last named plate having a flanged opening entering said stem, a bulb communicating with the stem, said bulb and bellows being charged with a temperature responsive fluid for causing expansion of the bellows, a stud secured to the outer plate and extending through the flange in the inner plate, a washer on the protruding portion of the stud engageable with said flange to limit the expansive movement of the bellows, said stud being engageable with the stem to limit the compressive movement of the bellows.

2. In a thermostatic expansion valve, a valve body, a valve actuating pin therein, a housing having an open end removably secured to the body, an adjusting nut rotatably secured to the remaining extremity of the housing and having a threaded opening therein, a thermostatic unit comprising an expansive chamber, an exteriorly threaded hollow stem secured thereto, a bulb, and a tube connecting the bulb to the stem, said unit being insertable in said housing by threading the bulb and tube through the adjusting nut to engage the stem with the threads thereof, and, upon application of the housing to the body, said bellows being compressed upon engaging the pin, said bellows being also formed with means for limiting its expansive movement upon disassembly with the housing.

LAWRENCE C. SMITH.